United States Patent [19]

Varga

[11] Patent Number: 4,950,491

[45] Date of Patent: Aug. 21, 1990

[54] PROCESS FOR PREPARING POWDERED FRUIT

[76] Inventor: Elemér Varga, Arany János ut 16, 1221 Budapest, Hungary

[21] Appl. No.: 391,158

[22] Filed: Aug. 9, 1989

[51] Int. Cl.$^5$ .............................................. A23B 7/00
[52] U.S. Cl. .................................... 426/242; 426/473
[58] Field of Search ................ 426/242, 473, 518, 254

[56] References Cited

U.S. PATENT DOCUMENTS 1,053,955  2/1913  Plunkett .............................. 426/242

FOREIGN PATENT DOCUMENTS 63-304941  12/1988  Japan .................................... 426/242

*Primary Examiner*—George Yeung
*Attorney, Agent, or Firm*—Schweitzer & Cornman

[57] ABSTRACT

The present invention relates to a process for preparing fruit powder from fruit or fruit by-products of industrial processing of fruits, wherein the fruit of fruit by-product is cut up, and dried in microwave apparatus at a maximum temperature of about 65° C., and then comminuted.

Preferred fruits processed according to the invention are apple, fruit with pits, berries, citrus fruit, and tropical fruit.

The fruit powder according to the invention can be used for human consumption and fodder.

8 Claims, No Drawings

PROCESS FOR PREPARING POWDERED FRUIT

FIELD OF THE INVENTION

The present invention relates to a process for preparing powdered fruit from fruit itself, or from the residue from the industrial processing of fruits. The process according to the invention is most suitably used during the processing of apples, but it can be used also for preparing powders from other fruits, such as from apricots, and morello (sour) cherries, as well as from other fruits.

As used throughout the specification and claims, the term "fruit" is intended to encompass whole fruit or any component or derivative thereof that is suitable for processing into powdered fruit in accordance with the present invention.

The term "grinding" as used herein, refers to any and all manner of comminuting larger, dried fruit particles to obtain smaller fruit particles of desired size and shape.

BACKGROUND OF THE INVENTION

If fruit is not consumed fresh or as a preserve, it can be worked up by other methods. The most known and widely used such other method is the preparation of juice. Soft drinks, carbonated fruit drinks, and powdered, dried fruit aroma are prepared from fruit or fruit concentrate in a manner which requires a significant consumption of energy (also for producing soft drinks, especially in the winter). There is no known method for utilizing the husk residue of fruit processing. Husk cannot be fermented, or ensiled, and it is not suitable for improving the soil either, because it ruins the soil.

A further possibility for preserving fruit is dehydration, but this is a method used rather in the household than in industry, and there is virtually no literature dealing with this method other than household cookbooks.

There are also methods of higher technological level, for working up fruits, e.g. freeze-drying (see e.g. published Japanese patent application No. 58,086,045), but those methods are very demanding on instrumentation and it decreases the vitamin and other valued internal contents of the fruit, notwithstanding the fact that freeze-drying is considered to be a relatively gentle method.

A part of the fruit is unsuitable for further processing (e.g. green, and fallen fruit), another part of the fruit (substandard, damaged fruit, third- and fourth-class fruit) can be sold cheaply, or can be processed into a low-grade, inexpensive product.

DESCRIPTION OF THE INVENTION

The invention is a process by the use of which fruits and byproducts of fruit processing can be worked up into an end product of added vale.

The invention is based on the recognition that a grindable dry fruit product can be produced by drying in microwave apparatus. Even though cooking and baking generally in microwave equipment is well known, this new use such apparatus produces an unexpected and unforeseeable result.

The invention relates to a process for preparing fruit powder from fruit or from by-products of fruit processing. The carefully cleaned fruit or by-product is cut up, dried in a microwave apparatus, the dry matter is ground and is optionally fractionated.

The process according to the invention can be used for processing any kind of fruit. For example, apple-type fruit, such as apple, pear, and quince; stone-containing fruit, such as cherry, sour cherry, plum, and apricot; berries, such as red currant, raspberry, blackberry, and grape; citrus fruits, such as lemon, orange, mandarin, and grapefruit; and tropical fruits, such as bananas can be mentioned, and among them fruits apple, peach, sour cherry, orange and banana are deemed to be most suitable for use in connection with the process of the invention.

According to a preferred embodiment of the invention applies are cut up, dried in microwave equipment, and are then ground to a powder.

According to another preferred embodiment of the invention apple cores are dried and ground, and the grist can be used for fodder, as a substitute for alfalfa powder.

Drying is carried out in accordance with the present invention in microwave apparatus.

Drying can be carried out continuously or batchwise. There are large microwave tunnels available, that are suitable for continuous drying. This method is preferred when large amount of centrally purchased fruit is to be processed, such as in a cannery or food factory. Microwave ovens used in the household are suitable for batchwise drying processes. This has a great importance in fruit producing areas, because when local processing, or at least drying locally is assured by the use of several drying units, the amount of fruit that has to be shipped is reduced to 1/10 of the original amount.

Drying is suitably carried out at from about 35° C. to about 40° C. but in no case above 65° C., so treatment of the fruit is clearly gentle and the fruit retains its vitamin content, other internal values. It must, however, be taken into consideration that the water content is not completely removed, because the dry, anhydrous material will quickly carbonize. The final water content can be from about 5 to about 17% by mass. It actually depends on what kind of comminuting apparatus is available for cutting and grinding, and what will be the ultimate use of the product. If a good disintegrator is available, it is not necessary to dry the apple completely. At a water content of about 15% and the powder can be used right away for adding dietary fiber to fruit juice.

The drying period depends to a large extend on the equipment used. A microwave oven combined with two level heating is capable of drying about 1000 g of sliced apples within from about 10 to about 15 minutes, while in more modern apparatus the same amount can be dried within about 3 minutes. Some routine pre-testing is required to determine the optimum drying period for the given equipment.

In the case of certain fruits, such as in the processing of unpeeled apple, or when using an industrial fruit residue, a yellowish, yellowish-brown product of sawdust is obtained.

The purity of fruit powder can be increased by removing the skin and other hard to process parts, such as the core of the fruit.

To prepare white fruit powder, before drying the fruit is treated with an acid that is acceptable in the food industry. For example, a mono-or multivalent organic acid can be used, such as acetic acid, citric acid, or malic acid.

Taking into consideration that microwave dries the fruit from the inside out, the remaining humidity remaining in the fruit gathers at its surface. In such cases post-drying can be used, if necessary, by employing an infrared radiator, such a lamp, to provide gentle drying.

Drying is followed by grinding. The dry matter can be ground in any suitable grinding apparatus, disintegrator, fractionating mill, or grinder. The particle size can range from fine powder to coarse grist. If desired, the ground fruit powder can be fractionated, for example in a cyclone, where different fractions can be obtained, all the way from mealy-fine to granular-crumby.

The product contains from about 5 to about 17% residual humidity. If it is not held to the exclusion of air, or in a dry place, it takes up further amounts of water. The product can be stored for years at a temperature of from about 10° C. to about 15° C.

The process is described in detail below, with reference to the illustrative example of apple.

Apple is carefully washed. Rotten or damaged apples or parts are removed. The cores are then removed and the fruit is sliced. The automatic slicer cuts the apple into 8–12 parts. The thickness of the slices in generally between about 0.8 and about 1.5 cm.

Apple powder is mildly smelling of apple, its flavor is pleasant, slightly tart, and reminds one of the flavor of dried fig, but is slightly more tart. The calorie content of apple powder is low, so it can also be consumed by diabetics and those on a diet. It can be consumed by itself, or processed into other foods, such as mixture of yogurt with apple powder, cakes containing apple powder instead of floor, mixture of apple powder and wheat bran, and soy grits and wheat bran as a gentle meal and a dietetic composition for weight loss. It is especially useful in that children that are sensitive to fluorides can eat unlimited amounts of apple powder prepared according to the invention.

People mainly in the most developed countries have incorrect eating habits, namely they consume too little of natural dietary fiber. According to current nutritional thinking the consumption of sufficiently large amounts of fibrous matter is very important. Different fibrous pulpy fruit juices can supply some of the fiber requirement, but they are not available with a sufficient amount of dietary fiber. Tests proved that by using the fruit powder prepared according to the present invention, and especially by the use of apple powder of very high fiber content, the fiber content of any fruit juice can be vastly increased. For example, apricot juice can be made to contain nutritional fiber with apple powder.

Some data concerning the fiber content and compositions of fruit powders are provided in the following table.

|  | Apple Powder | Apricot Powder | Sour Cherry Powder |
|---|---|---|---|
| Indigestible dietary filament (%) | 19.5 | 7.1 | 3.5 |
| Composition of dietary filament (%) |  |  |  |
| Alemicel cellose | 11.3 | 2.9 | 1.8 |
| Cellulose | 8.2 | 2.3 | 0.6 |
| Lignin | 0.04 | 1.9 | 1.1 |
| Pectin content (%) total within this | 4.5 | 2.0 | 1.3 |
| water soluble pectin (%) | 3.9 | 1.5 | 0.7 |
| protopectin | 0.4 | 0.3 | 0.5 |
| pectin-pectinate | 0.2 | 0.2 | 0.1 |
| Others: |  |  |  |

|  | Apple Powder | Apricot Powder | Sour Cherry Powder |
|---|---|---|---|
| -continued |  |  |  |
| protein (%) | 0.6 | 0.2 | 0.1 |
| fat (%) | 0.8 | 0.6 | 0.2 |
| carbonyl rate (%) | 0.7 | 0.3 | 0.1 |

The invention is described in greater detail through the following illustrative examples.

EXAMPLE 1

Preparation of Apple Powder 1000 g of early summer apple are washed and then the cores are removed (their weight is about 30 g). The apple is cut to 1 cm thick slices and placed on the glass tray of a microwave oven equipped with two level (under and/or upper) heating. The oven is turned to the second position (corresponding to the "holding" by cooking) and the slices are dried for 12 minutes. The dry matter weighs 220 g. The dry matter is then ground in a size selecting mill (a mill yielding two fractions due to special development of the pipe off loading the ground matter). Total amount of the ground matter obtained is 180 g, of which 80 is a second fraction of rough particles, have a darker color, while the remaining 100 g is a white fine flour-like product.

EXAMPLE 2

Preparation of Apple Powder 1000 g of whole winter apple are cleaned, sliced and dried according to Example 1, then ground in a grinder. 230 g mildly yellowish, product of sawdust-like substance are obtained.

EXAMPLE 3

Preparation of Peach Powder 100 g of peach are washed, the pits are removed but the fruit is not peeled because fiber is obtained form the skin of the fruit. The peaches are halved and placed into the microwave oven with their cut surface facing upwards. The process of Example 1 is then followed. A good smelling, greenish yellow peach powder is obtained.

EXAMPLE 4

Processing of Husks 1000 g of apple husks recovered during the preparation of apple juice, are crushed and placed into a microwave oven in a uniform layer thickness. a microwave oven of the type Panasonic NE-973 is used to try the crushed material within 3 minutes. The 405 g dry matter obtained is ground in a mill, providing two fractions as mentioned in Example 1. The fine fraction does not differ from that of Example 1, therefore it is suitable for human consumption. The rough fraction (containing the fibrous material also from the skin, core) is nutritionally equivalent of the best alfalfa fodder powder.

EXAMPLE 5

Preparation of White Apple Powder

White apple powder does not contain fibers, but contains vitamins in equivalent amounts the yellow apple powder, but sometimes the white product is specifically required for confectionery uses. The process described in Example 1 is followed with the difference that the apples are peeled then bleached by soaking in 5% vinegar. The apples are then sliced and then dried and ground as described above. The resulting powder is snow white.

EXAMPLE 6

Uses

A tasty meal can be prepared for people on diet from 70% apple powder, and 30% wheat bran.

A mild meal can be prepared both for children and for adults by mixing 40% apple powder, and 60% carrot powder.

2 pairs by weight of currant muesli and 1 part by weight of apple powder are mixed to a finer muesli which is higher in dietary fiber.

Apple powder which due to its residual water content can be easily compressed into tablets of 1 cm thickness, and 4 cm diameter. The tablets are sealed one-by-one, or in pairs into fine plastic foil bags and they are given as snacks to children inclined to obesity.

EXAMPLE 7

Preparation of a Grist From the By-Product of Orange and Banana Production 100 g skin separated from the pulp of healthy, ripe orange is cut to cubes. The cubes are predried in a thin layer thickness by convection at 40° until from about 25 to about 30% of moisture content is achieved, and is then sterilized by contact with diluted, aqueous citric acid solution.

In a microwave drier the product is dried at 40°–45° C. for 8 minutes. The moisture that was absorbed is thus removed and the product is partially dried to a moisture content of 15%. Further layer is continuously transported onward and is heated by infrared radiation. The water is removed from the partially dry matter that hass better permeability, until a moisture content of 5–10%. 520 g orange peel grist is obtained after cutting, grinding and optional separation into fractions.

Grist can also be prepared by the by-product of banana processing. The skin of the banana is separated from the interior fruit that has a high sugar content, and then treated as described above. The compositions of the various grists is:

|  | Orange | Banana |
| --- | --- | --- |
| moisture | 10.0% | 4.0% |
| protein | 3.1% | 4.4% |
| carbohydrate (total) | 48.9% | 52.0% |
| fibers | 29.0% | 24.0% |
| organic acids | 9.3% | 7.0% |
| ash | 4.7% | 2.0% |
| vitamins (C, $D^1$, $D^{12}$, K) | — | — |
| calories | 180/100 mg | 210/100 mg |
| dyes | 2.5% | — |
| volumne weight | 520 g/l | 580/100 mg |
| potassium | — | 620/100 mg |

Various other methods can also be used both in the household and in industry. Cream can be prepared from apple powder and/or apple pulp to produce entirely new food products, such as by combination with dairy products (e.g. apple-tasting cheese).

The advantages of the invention include:

the utilization of previously useless apple, and its processing into a product of value;

husks are utilized for a product suitable for use for fodder or even for human consumption;

a new product rich in fibers is obtained which can be used in many different ways, such as the especially valuable mitigation of problems of diabetics, and for fluorine sensitive and obese people.

I claim:

1. A process for preparing powdered fruit, which comprises cutting fruit into smaller pieces, drying the cut fruit in a single step in microwave apparatus at a maximum temperature of about 65° C., and then grinding the dried matter.

2. The process of claim 1 wherein the fruit is dried to water content of from about 5% to about 17% by mass.

3. The process of claim 1, wherein the fruit is apple, pear, quince, fruit having a stone, a berry, citrus fruit, or tropical fruit.

4. The process of claim 3, wherein the fruit with a stone is a cherry, sour cherry, plum, peach or apricot, the berry is red currant, raspberry, blackberry, or grape, the citrus fruit is orange, mandarine, lemon, or grapefruit, and the tropical fruit is banana.

5. A process for preparing powdered fruit, comprising removing one or more of the skin, stone, core and other hard part of the fruit as part of processing in accordance with claim 1.

6. The process of claim 1, further comprising pretreating the fruit, by contacting it with an alimentarily acceptable acid prior to drying.

7. The process of claim 6, wherein said acid is a mono- or multivalent organic acid.

8. The process of claim 7, wherein the acid is one or more of aceteic acid, citric acid, or malic acid.

* * * * *